Figure 1:
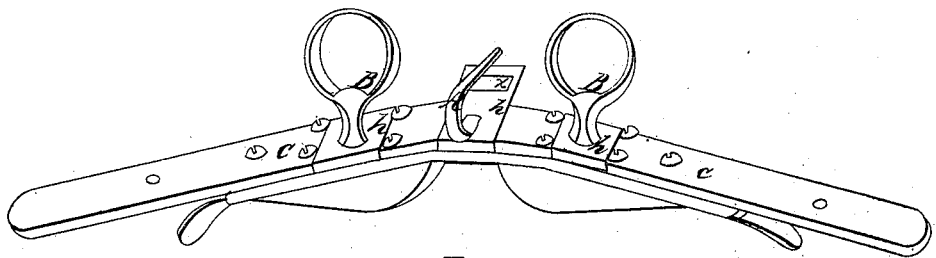
Figure 2:
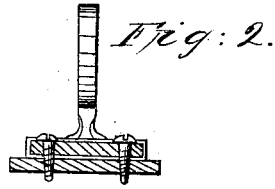

A. L. Hill.
Harness Trimming.

Nº 79,227.          Patented June 23, 1868.

Witnesses.
Wm Wansleben
Cornelius Cox

Inventor:
A. L. Hill
per Alexander Mason
Att'ys

United States Patent Office.

A. L. HILL, OF DECATUR, ILLINOIS.

Letters Patent No. 79,227, dated June 23, 1868.

IMPROVEMENT IN FASTENING CHECK-HOOKS AND TERRETS.

The Schedule referred to in these Letters Patent and making part of the same.

TO ALL WHOM IT MAY CONCERN:

Be it known that I, A. L. HILL, of Decatur, in the county of Macon, and in the State of Illinois, have invented certain new and useful Improvements in Mode of Fastening Check-Hooks and Terrets; and do hereby declare that the following is a full, clear, and exact description thereof, reference being had to the accompanying drawings, and the letters of reference marked thereon.

In the annexed drawings, making a part of this specification, A represents the check-hook, and B B the terrets of an ordinary harness-saddle. Said hook and terrets are secured to or have cast on them loops, $h\ h$, as shown in the drawings. These loops $h\ h$ are made so as to just fit over and embrace the back or saddle-strap C. The loop of the check-hook A is provided with a slot, $x$, through which the back-strap of the harness passes, and thereby attached to the saddle.

It will be seen that the hook A and terrets B B are thus readily and securely adjusted or fastened in the place desired, and that the slot $x$ affords a convenient and desirable means of attaching the back strap of the harness to the saddle thereof.

Having thus fully described my invention, what I claim as new, and desire to secure by Letters Patent, is—

Providing the terrets B B and check-hook A with loops $h\ h$, as and for the purpose specified.

In testimony that I claim the foregoing, I have hereunto set my hand and seal, this 11th day of March, 1868.

A. L. HILL. [L. S.]

Witnesses:
MILBURN GLORE,
MARTIN P. MURPHEY.